US012297963B1

(12) United States Patent
Holland

(10) Patent No.: US 12,297,963 B1
(45) Date of Patent: May 13, 2025

(54) SYSTEMS AND METHODS FOR REFUELING LIQUEFIED PETROLEUM (LP) GAS TANKS

(71) Applicant: Blossman Services, Inc., Ocean Springs, MS (US)

(72) Inventor: Stephen Holland, Fletcher, NC (US)

(73) Assignee: Blossman Services, Inc., Ocean Springs, MS (US)

( * ) Notice: Subject to any disclaimer, the term of this patent is extended or adjusted under 35 U.S.C. 154(b) by 0 days.

(21) Appl. No.: 18/505,817

(22) Filed: Nov. 9, 2023

(51) Int. Cl.
*F17C 5/02* (2006.01)
*F17C 5/00* (2006.01)

(52) U.S. Cl.
CPC ................ *F17C 5/02* (2013.01); *F17C 5/007* (2013.01); *F17C 2205/0326* (2013.01); *F17C 2205/0338* (2013.01); *F17C 2205/0352* (2013.01); *F17C 2221/035* (2013.01); *F17C 2223/0153* (2013.01); *F17C 2227/0157* (2013.01); *F17C 2250/03* (2013.01); *F17C 2250/043* (2013.01); *F17C 2250/0636* (2013.01); *F17C 2265/065* (2013.01)

(58) Field of Classification Search
CPC .... F17C 5/02; F17C 5/007; F17C 2205/0326; F17C 2205/0338; F17C 2205/0352; F17C 2221/035; F17C 2223/0153; F17C 2227/0157; F17C 2250/03; F17C 2250/043; F17C 2250/0636; F17C 2265/065
USPC .............................................................. 141/1
See application file for complete search history.

(56) References Cited

U.S. PATENT DOCUMENTS

| | | | | |
|---|---|---|---|---|
| 3,486,297 | A | 12/1969 | Eisinga et al. | |
| 5,687,776 | A * | 11/1997 | Forgash | F17C 9/00 141/2 |
| 2004/0187957 | A1 | 9/2004 | Scheeter, Jr. | |
| 2015/0060294 | A1* | 3/2015 | Prescott | C25B 9/05 204/278 |
| 2022/0147076 | A1* | 5/2022 | Nagar | G05D 16/208 |

* cited by examiner

*Primary Examiner* — Timothy L Maust
*Assistant Examiner* — Christopher M Afful
(74) *Attorney, Agent, or Firm* — STERNE, KESSLER, GOLDSTEIN & FOX P.L.L.C.

(57) ABSTRACT

A liquefied petroleum (LP) gas refueling system includes a compressor, a manifold unit, and a controller. The compressor draws vapor LP gas from a storage tank through a supply line and discharges vapor LP gas through a delivery line to a vehicle fuel tank. The manifold unit includes an intake passage coupled to the supply line and the intake of the compressor, a discharge passage coupled to the outlet of the compressor, an outlet passage coupled to the discharge passage and the delivery line, and a bypass passage coupled to the discharge and outlet passages. The manifold unit includes a bypass valve, a first outlet valve, and a second outlet valve. The controller actuates the bypass, first outlet, and second outlet valves according to a predetermined protocol to isolate and depressurize the outlet passage after finishing the refueling process.

23 Claims, 4 Drawing Sheets

SYSTEMS AND METHODS FOR REFUELING LIQUEFIED PETROLEUM (LP) GAS TANKS

BACKGROUND

Field

The disclosure relates to systems and methods for transferring liquefied petroleum (LP) gas, for example, from a storage tank to a fuel tank of a vehicle.

Background

LP gas is a by-product of natural gas processing and includes such fuels as propane and butane, and may also include amounts of propylene and butylene in various mixtures. As used herein, the terms "liquefied petroleum gas," "LP gas," and "LPG" are used interchangeably and are intended to refer to propane, butane, iso-butane, propylene, butylene, and methane, alone or in various mixtures, as well as to mixtures of other hydrocarbon gases that are stored in liquid form, under pressure, and are used as fuel for internal combustion engines.

LP gas is highly flammable and is commonly used for fueling cooking and heating appliances. LP gas is also increasingly being used to power personal and commercial vehicles. At normal atmospheric temperatures and pressures, LP gas is in a gas phase, but LP gas is in a liquid phase when stored under pressure, such as in a vehicle fuel tank. A partially filled vehicle fuel tank will typically contain some LP gas in a liquid phase as well as some LP gas in a gas phase.

Typically, a vehicle having an LP gas fuel system is refueled and operated similarly to other liquid fueled vehicles, such as those running on gasoline or diesel. During the refueling operation, a pump is typically used to move liquid LP gas from a storage tank to a vehicle fuel tank. Unlike gasoline and diesel refueling operations, LP gas-powered vehicles usually include a fuel system having a connector for receiving fuel from a refueling station and a vehicle fuel tank to store LP gas. Conventional LP gas refueling stations include a refueling pump for removing liquid LP gas from a storage tank, a pump station for controlling the refueling pump and monitoring the flow of liquid LP gas dispensed from the refueling pump, and a nozzle for dispensing fuel into the vehicle fuel tank of vehicle.

There are a number of ways that the pump station terminates a refueling operation. For example, a user can stop refueling at any point be releasing the lever on the nozzle, or the pump station can limit an amount of fuel based on the amount that was purchased. The pump station can also stop refueling upon activation of an overfill protection device (OPD) within the vehicle. An OPD prevents overfilling of the vehicle's fuel tank. Typically, OPD includes a float located near the fuel tank's fill inlet, where the float rises as liquid LP gas fills the fuel tank, and a plug that plugs the tank fill inlet when the float raises to a predetermined fuel level, typically 80% of the tank level. Conventional pump stations monitor the flow of liquid LP gas being dispensed to the vehicle such that when the flow of fuel stops (i.e., the rate of flow of the fuel is substantially zero gallons per minute due to the tank fill inlet being plugged by OPD), conventional pump stations turn off the refueling pump.

While convention LP gas refueling stations allow vehicles to be refueled relatively quickly, conventional LP gas refueling stations have limitations that discourage or hamper the more widespread adoption of LP gas use in vehicles. For example, there are relatively few LP gas refueling stations in the United States, meaning that owners of LP gas fueled vehicles are forced to either drive extra distances for refueling or purchase refueling pumps for installation at the customer's home or business. Furthermore, transferring LP gas in a liquid state is difficult to meter effectively.

BRIEF SUMMARY

The present disclosure includes various embodiments of a liquefied petroleum (LP) gas refueling system.

In some embodiments, the LP gas refueling system includes a supply line connected to a storage tank storing LP gas. In some embodiments, the LP gas refueling system includes a delivery line connected to a fuel tank of the vehicle. In some embodiments, the LP gas refueling system includes a compressor connected to the supply line and the delivery line. In some embodiments, the compressor is configured to draw vapor LP gas from the storage tank through the supply line and discharge vapor LP gas through the delivery line to the fuel tank of the vehicle. In some embodiments, the LP gas refueling system includes a first outlet valve biased to a closed position to stop the discharge of vapor LP gas to the delivery line and configured to be actuated to an open position to transfer vapor LP gas discharged from the compressor to the delivery line. In some embodiments, the LP gas refueling system includes a first pressure switch biased to an open position and configured to be actuated to a closed position when pressure of vapor LP gas in the delivery line reaches a first pressure threshold. In some embodiments, the LP gas refueling system includes a controller operatively coupled to the compressor, the first outlet valve, and the first pressure switch. In some embodiments, the controller is configured to activate and deactivate the compressor. In some embodiments, the controller is configured to actuate the first outlet valve to the open position when activating the compressor such that vapor LP gas discharged from the compressor transfers to the delivery line. In some embodiments, the controller is configured to actuate the first outlet valve to the closed position when the first pressure switch is actuated to the closed position.

In some embodiments, the LP gas refueling system includes a discharge passage coupled to an outlet of the compressor and the first outlet valve; and In some embodiments, the LP gas refueling system includes an outlet passage coupled to the first outlet valve and the delivery line, wherein the first pressure switch is coupled to the outlet passage.

In some embodiments, the LP gas refueling system includes a bypass passage coupled to the discharge passage and the outlet passage.

In some embodiments, the LP gas refueling system includes a second outlet valve coupled to the bypass passage and the outlet passage, the second outlet valve biased to a closed position to isolate the outlet passage from the bypass passage and configured to be actuated to an open position to transfer discharged vapor LP gas from the outlet passage to the bypass passage.

In some embodiments, the controller is operatively coupled to the second outlet valve, and the controller is configured to actuate the second outlet valve to the open position when the first pressure switch is actuated to the closed position.

In some embodiments, the LP gas refueling system includes a second pressure switch biased to an open position, the second pressure switch configured to be actuated to a closed position when pressure of vapor LP gas in the discharge line reaches a second pressure threshold that is greater than the first pressure threshold.

In some embodiments, the controller is configured to deactivate the compressor when the second pressure switch is actuated to the closed position.

In some embodiments, the LP gas refueling system includes a bypass valve coupled to the discharge passage and the bypass passage. In some embodiments, the bypass valve is biased to an open position to transfer vapor LP gas in the discharge passage to the bypass passage. In some embodiments, the bypass valve is configured to be actuated to a closed position to isolate the discharge passage from the bypass passage.

In some embodiments, the controller is configured to actuate the bypass valve to the closed position when activating the compressor to discharge vapor LP gas to the delivery line.

In some embodiments, the controller is configured to actuate the bypass valve to the open position after a predetermined period of time following deactivation of the compressor.

In some embodiments, the predetermined period of time ranges from 0.5 seconds to 10 seconds.

In some embodiments, the controller is configured to deactivate the compressor when the first pressure switch is actuated to the closed position.

In some embodiments, a liquefied petroleum (LP) gas refueling system includes a compressor configured to draw vapor LP gas through a supply line from a storage tank and discharge vapor LP gas through a delivery line to a fuel tank of the vehicle. In some embodiments, the LP gas refueling system includes a manifold unit. In some embodiments, the manifold unit includes an inlet manifold coupled to the supply line and an intake of the compressor. In some embodiments, the manifold unit includes a discharge passage coupled to the outlet of the compressor. In some embodiments, the manifold unit includes an outlet passage coupled to the discharge passage and the delivery line. In some embodiments, the manifold unit includes a bypass passage coupled to the inlet manifold and the outlet passage. In some embodiments, the manifold unit includes a bypass valve coupled to the discharge passage and the bypass passage. In some embodiments, the bypass valve is biased to an open position to transfer vapor LP gas in the discharge passage to the bypass passage. In some embodiments, the bypass valve is configured to be actuated to a closed position to isolate discharge passage from the bypass passage. In some embodiments, the LP gas refueling system includes a controller operatively coupled to the compressor and the bypass valve, the controller configured to activate and deactivate the compressor. In some embodiments, the controller is configured to actuate the bypass valve to the closed position when activating the compressor to discharge vapor LP gas to the delivery line and to actuate the bypass valve to the open position after a predetermined period of time following deactivation of the compressor.

In some embodiments, the manifold unit includes a first outlet valve coupled to the discharge passage and the outlet passage, a second outlet valve coupled to the outlet passage and the bypass passage. In some embodiments, the first and second outlet valves are each biased to a closed position to isolate outlet passage from the discharge passage and the bypass passage. In some embodiments, the first outlet valve is configured to be actuated to an open position to transfer vapor LP gas discharged from the compressor to the outlet passage. In some embodiments, the second outlet valve is configured to be actuated to an open position to transfer discharged vapor LP gas from the outlet passage to the bypass passage.

In some embodiments, the controller is operatively coupled to the first and second outlet valves. In some embodiments, the controller is configured to actuate the first outlet valve to the open position when activating the compressor to discharge vapor LP gas to the delivery line, while setting the second outlet valve in the closed position.

In some embodiments, the controller is configured to: actuate the first outlet valve to the closed position, actuate the second outlet valve to the open position, and deactivate the compressor, in response to the pressure of vapor LP gas in the outlet passage reaching a predetermined pressure threshold.

In some embodiments, the controller is configured to actuate the second outlet valve to the closed position during the predetermined period of time after deactivation of the compressor and before actuating the bypass valve to the open position.

In some embodiments, the LP gas refueling system includes a first pressure switch coupled to the outlet passage and operatively coupled to the controller. In some embodiments, the first pressure switch is biased to an open position. In some embodiments, the first pressure switch is configured to be actuated to a closed position to output a signal to the controller when pressure of vapor LP gas in the delivery line reaches the first pressure threshold.

In some embodiments, the controller includes a first latch relay operatively coupled to the first outlet valve, a second latch relay operatively coupled to the bypass valve, and a third latch relay operatively coupled to the second outlet valve. In some embodiments, the controller includes a relay module configured to selectively actuate the first, second, and third relays according to a predetermined protocol.

The present disclosure includes various embodiments of a method for transferring vapor liquefied petroleum (LP) gas from a storage tank to a fuel tank of a vehicle.

In some embodiments, the method includes activating a compressor coupled to a manifold unit to draw vapor LP gas from the storage tank and discharge the vapor LP gas through a discharge passage and an outlet passage of the manifold unit to the fuel tank of the vehicle. In some embodiments, the method includes isolating the outlet passage from the discharge passage and deactivating the compressor in response to detecting a pressure in the outlet passage reaching a predetermined pressure threshold. In some embodiments, the method includes transferring vapor LP gas from the outlet passage to a bypass passage of the manifold unit to depressurize the outlet passage. In some embodiments, the method includes isolating the outlet passage from the bypass passage after a first period of time from initiating the transferring of vapor LP pas from the outlet passage to the bypass passage. In some embodiments, the method includes transferring vapor LP gas from the discharge passage to the bypass passage after a second period of time from initiating the transferring of vapor LP pas from the outlet passage to the bypass passage, wherein the second period of time is greater than the first period of time.

In some embodiments, the activating of the compressor includes closing a bypass valve coupled to the discharge passage and the bypass passage to raise pressure of the vapor LP gas discharged from the compressor. In some embodiments, the transferring of vapor LP gas from the discharge passage to the bypass passage includes opening the bypass valve.

In some embodiments, the activating of the compressor includes opening a first outlet valve coupled to the discharge passage and the outlet passage to transfer vapor LP gas discharged from the compressor to the outlet passage. In some embodiments, the isolating of the outlet passage from the discharge passage includes closing the first outlet valve.

In some embodiments, the transferring of vapor LP gas from the outlet passage to the bypass passage includes opening a second outlet valve coupled to the outlet passage and the bypass passage. In some embodiments, the isolating the outlet passage from the bypass passage includes closing the second outlet valve.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
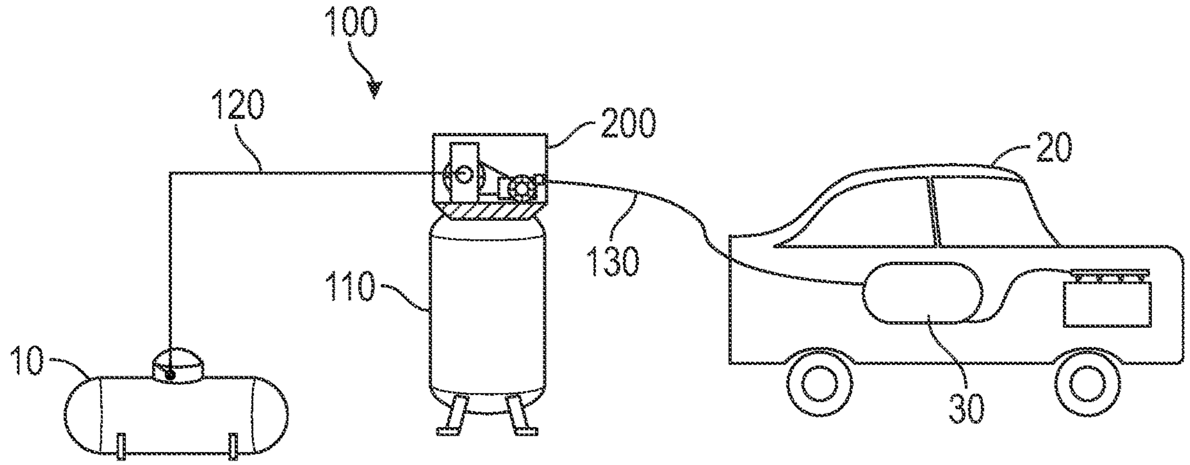
FIG. 1 illustrates a refueling system coupled to a storage tank and a fuel tank of a vehicle according to an embodiment of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate embodiments consistent with the disclosure. References in the Detailed Description to "one embodiment," "an embodiment," "some embodiments," "certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is within the knowledge of those skilled in the relevant art(s) to affect such feature, structure, or characteristic in connection with other embodiments whether or not explicitly described.

The following Detailed Description of the embodiments reveals the general nature of the disclosure so that others can, by applying knowledge of those skilled in the relevant art(s), readily modify and/or adapt for various applications such embodiments, without undue experimentation, without departing from the spirit and scope of the disclosure. Therefore, such adaptations and modifications are intended to be within the meaning and plurality of equivalents of the embodiments based upon the teaching and guidance presented herein. It is to be understood that the phraseology or terminology herein is for the purpose of description and is to be interpreted by those skilled in relevant art(s) in light of the teachings herein.

In the context of the present disclosure, the term "connected" can refer to a direct connection between two elements without any intervening components or an indirect interconnection with the presence of intervening components between the connected elements. For example, a fuel line can be connected to a source tank by coupling the fitting of the fuel line directly to the port of the source tank or coupling the fitting of the fuel line indirectly to the port via an intermediate component, such as a pressure regulator, whereby the direct and indirect interconnections both establish fluid communication between the source tank and the fuel line.

The refueling of LPG tanks used in motor vehicles has historically been liquid transfer only to provide quicker refueling rates (e.g., 10 gpm) that are comparable to traditionally gasoline refueling stations. But refueling vehicles via liquid transfer has drawbacks. First, liquid refueling stations must meet stricter regulations (e.g., National Fire Protection Association 30A) to transfer combustible liquid fuel at these rates. For example, these regulations require multiple safety measures designed to protect the refueling equipment and the users from harm caused by mishandling and vehicle collisions. Such regulations have made it unfeasible to create a traditional liquid LPG refueling "station" at one's private residence with curbs, bollards, signage etc. Notably, most residential LPG storage tanks are equipped with only a vapor withdrawal port which is connected to the home by way off first and second stage regulators, tubing and fittings to supply home appliances designed to work on low pressure vapor (heaters, stoves, clothes dryers, etc.). Refilling a vehicle at home using only LPG vapor both before and after the refueling system maintains a safer environment as with all other common household appliances using LPG.

Second, the temperature of liquid LPG fuel must be controlled precisely to accurately deliver true gallons of propane at various temperatures. Liquid LPG meters are cost-prohibitive for a small volume refueling system, whereas vapor metering devices are cost significantly less and can be added to the inlet port of a refueling unit when metering is needed for accounting (e.g., separating billing or calculating road taxes).

While transferring LP gas in vapor state is more effective for metering fluid flow, vapor LP gas tends to condense in the fuel lines, requiring stricter pressure regulations for the refueling system.

The present disclosure presents refueling systems and methods for transferring vapor LP gas from a storage tank to a recipient tank, such as a fuel tank of a vehicle, that overcomes the limitations of known systems and methods noted above. The disclosed refueling systems can include a compressor, a manifold unit, and a controller. The compressor is configured to draw vapor LP gas from a storage tank through a supply line and discharge vapor LP gas through a delivery line to the fuel tank of the vehicle. The manifold unit includes passages, valves, and pressure switches to regulate the flow of vapor LP gas received from the supply line to the delivery line in a manner that effectively controls LP gas drawn from the storage tank while minimizing condensation of vapor LP gas in the refueling system and reducing amperage draw of the compressor. The controller is configured to actuate the compressor and the valves according to a predetermined protocol that delivers vapor LP gas efficiently and reliably to the fuel tank of the vehicle.

FIG. 1 is a block diagram illustrating a LP gas refueling system 100, according to an embodiment of the present disclosure. Refueling system 100 can be connected to a LP gas storage tank 10 and a fuel tank 30 of a vehicle 20. Storage tank 10 can be any storage tank configured to store and permit transfer of LP gas, including both vapor and liquid LP gas. Vehicle 20 can be an automobile, bus, truck, freight carrier, off-road vehicle, aircraft, boat, or other type of vehicle configured to store and operate via LP gas. In some embodiments, refueling system 100 can transfer LP gas to a recipient tank not associated with a vehicle.

Refueling system 100 is configured to remove and transfer vapor LP gas from storage tank 10 to fuel tank 30 of vehicle 20. Refueling system 100 can include a compressor 110 configured to pump vapor LP gas stored in storage tank 10 to fuel tank 30 through a plurality of distribution lines. Compressor 110 can discharge vapor LP gas at a volumetric flow rate (e.g., 5 cfm to 150 cfm) sufficient to transfer a desired volume of vapor LP fuel from storage tank 10 to fuel tank 30 within a reasonable amount of time. Compressor 110 can be configured to pump only vapor LP gas through refueling system 100, without removing liquid LP gas from storage tank 10, such that only vapor LP gas is transferred to fuel tank 30. At fuel tank 30, vapor LP gas condenses to liquid state to be stored in fuel tank 30. In some embodiments, compressor 110 can be a R290-type compressor that can be powered by a standard 115/120 AC voltage supply. For example, compressor 110 can include any compressor designed for handling combustible mixtures.

Refueling system 100 can include a supply line 120 coupled to storage tank 10 to deliver vapor LP gas from storage tank 10 to compressor 110 of refueling system 100. Supply line 120 can include conduits, tubes, pipes, and/or flexible hoses formed from a material that is substantially resistant to degradation by contact with an LP gas and having sufficient structural integrity to maximum allowable operating system pressures (e.g., 2 PSI-300 PSI). In some embodiments, supply line 120 can include a flexible hose or a rigid pipe formed from metals such as copper, brass, or steel, or some polymers such as polyethylene or nitrile, or combinations of these material. In some embodiments, supply line 120 can include a pipe line, such as a vapor LP gas supply line for a residential home, with a pressure regulator (e.g., a first stage pressure regulator) configured to deliver vapor LP gas to compressor 110 at a predetermined pressure, such as for example, a pressure in a range from 2 psig to 15 psig, such as 5 psig to 10 psig.

Refueling system 100 can include a delivery line 130 connected to fuel tank 30 of vehicle 20 to deliver vapor LP gas from compressor 110 at a high pressure, such as a pressure ranging from 5 psig to 300 psig. Delivery line 130 can include conduits, tubes, pipes, and/or flexible hoses formed from a material that is substantially resistant to degradation by contact with an LP gas and having sufficient structural integrity to maximum allowable operating system pressures (e.g., 2 psi-300 psi). In some embodiments, delivery line 130 can include a flexible hose formed from metals such as copper, brass, or steel, or some polymers such as polyethylene or nitrile, or combinations of these material. For example, delivery line 130 can be a synthetic rubber hose that provides sufficiently flexibility to facilitate the connection with fuel tank 30 of vehicle 20.

Refueling system 100 can include a manifold unit 200 for connecting compressor 110 with supply line 120 and delivery line 130. Manifold unit 200 can include a system of tubing or passages, valves, regulators, sensors, and/or controllers to regulate the flow of vapor LP gas received from supply line 120 to delivery line 130 in a manner that effectively controls LP gas drawn from storage tank 10 (e.g., withdrawing LP gas from storage tank 10 with minimal waste) while minimizing condensation of vapor LP gas in refueling system 100. The passages and/or tubing of manifold unit 200 can be formed from a material that is substantially resistant to degradation by contact with LP gas and having sufficient structural integrity to maximum allowable operating system pressures (e.g., 2 psi-300 psi).

Figure 2:
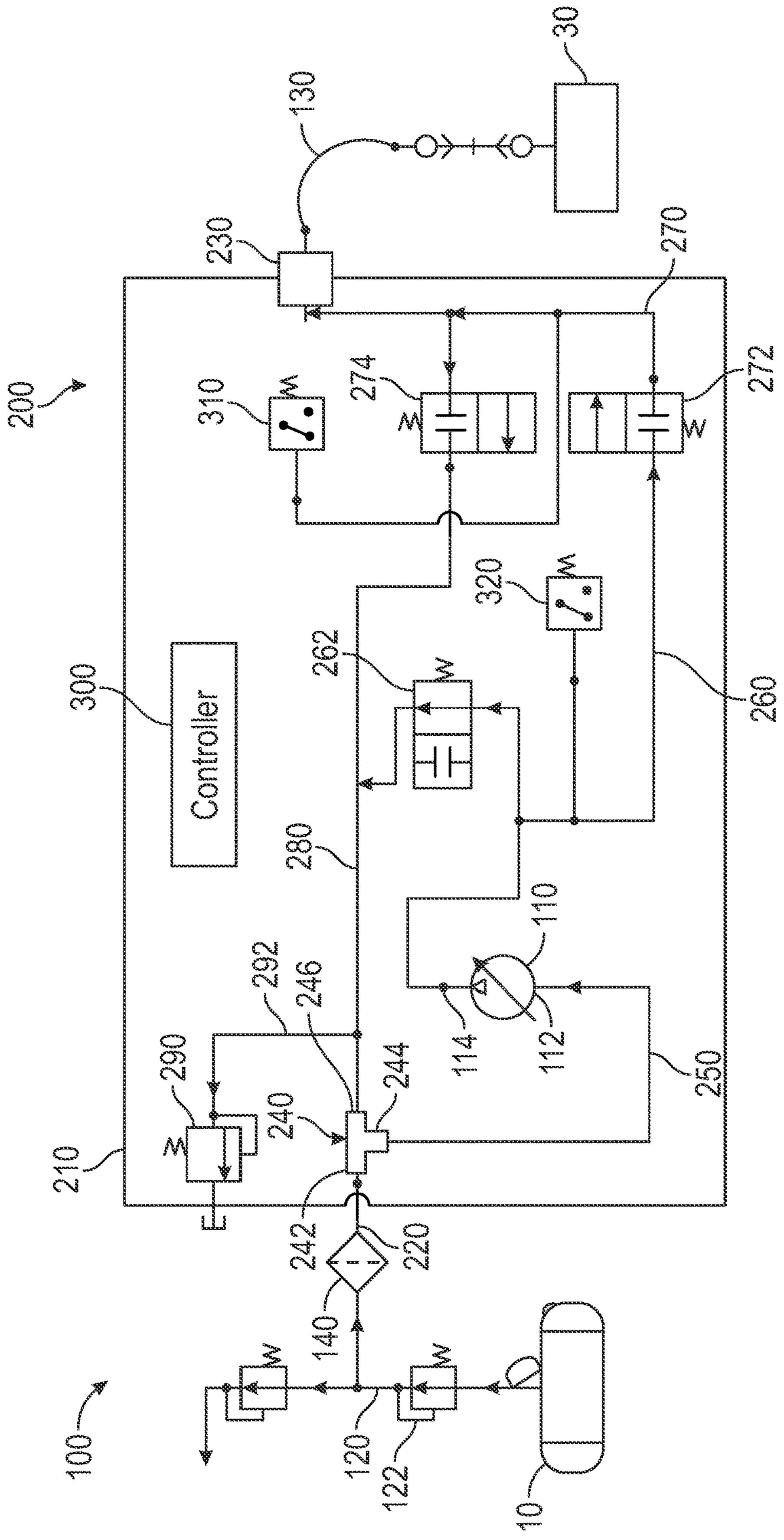
FIG. 2 illustrates a schematic of a refueling system according to an embodiment of the present disclosure.

FIG. 2 illustrates a schematic of refueling system 100, including manifold unit 200, according to embodiments of the present disclosure. In some embodiments, manifold unit 200 can include a housing 210 containing the system of passages and valves of manifold unit 200. Manifold unit 200 can include an inlet 220 coupled to supply line 120 to receive vapor LP gas drawn from storage tank 10. In some embodiments, refueling system 100 can include a filter 140 located on supply line 120 proximate to inlet 220 of manifold unit 200 to supply filtered vapor LP gas (e.g., LP gas free or essentially free from debris) to compressor 110. In some embodiments, supply line 120 can include a pressure regulator 122 to deliver vapor LP gas to inlet 220 at a predetermined pressure (e.g., 5 psig to 10 psig). Manifold unit 200 can include an outlet 230 coupled to delivery line 130 to deliver compressed, high-pressure vapor LP gas from compressor 110 to tank 30 of vehicle 20. In the context of the present disclosure, high-pressure vapor LP gas can in a range from 5 psi to 300 psi.

In some embodiments, manifold unit 200 can include an inlet manifold 240 having a first port 242 located at or proximate to inlet 220. Manifold unit 200 can include an intake passage 250 coupled to a second port 244 of inlet manifold 240 and to an intake 112 of compressor 110. Manifold unit 200 can include a discharge passage 260 coupled to an outlet 114 of compressor 110 for discharging compressed vapor LP gas. Manifold unit 200 can include an outlet passage 270 coupled to discharge passage 260 and outlet 230 to deliver compressed vapor LP gas to outlet 230 and delivery line 130. Manifold unit 200 can include a bypass passage 280 coupled to a third port 246 of inlet manifold 240 and outlet passage 270. In some embodiments, bypass passage 280 is configured to direct vapor LP gas discharged from outlet 114 of compressor 110 back to inlet 220 or an accumulator coupled to inlet manifold 240 to depressurize discharge passage 260 and/or outlet passage 270.

Manifold unit 200 can include any suitable number of valves to regulate the flow of vapor LP gas received at inlet 220 and to control the pressure of vapor LP gas discharged to outlet 230.

In some embodiments, manifold unit 200 can include a pressure relief valve 290 coupled to bypass passage 280. Pressure relief valve 290 can be biased to a closed position and configured to be actuated to an open position to release vapor LP gas from refueling system 100 in response to pressure reaching a predetermined threshold in bypass passage 280. Manifold unit 200 can include a vent passage 292 connecting pressure relief valve 290 and bypass passage 280.

In some embodiments, manifold unit 200 can include a bypass valve 262 coupled to discharge passage 260 and bypass passage 280 to control the pressure of vapor LP gas discharged from outlet 114 of compressor 110. In some embodiments, bypass valve 262 can be a solenoid valve biased to an open position. At the open position, bypass valve 262 permits vapor LP gas to transfer from discharge passage 260 to bypass passage 280, so that compressor 110 creates no rise in vapor pressure.

In some embodiments, manifold unit 200 can include a first outlet valve 272 coupled to discharge passage 260 and outlet passage 270 to selectively permit vapor LP gas discharged from compressor 110 to transfer to outlet 230, ultimately to tank 30 of vehicle 20 via delivery line 130. In some embodiments, first outlet valve 272 can be a solenoid valve biased to a closed position. At the closed position, first outlet valve 272 isolates outlet passage 270 from discharge passage 260 such that vapor LP gas in discharge passage 260 is prevented from transferring to outlet 230 of manifold unit 200.

In some embodiments, manifold unit 200 can include a second outlet valve 274 coupled to outlet passage 270 and bypass passage 280 to selectively direct vapor LP gas received in outlet passage 270 to bypass passage 280, thereby depressurizing outlet passage 270 and delivery line 130. In some embodiments, second outlet valve 274 can be a solenoid valve biased to a closed position. At the closed position, second outlet valve 274 isolates outlet passage 270 from bypass passage 280 such that vapor LP gas in outlet passage 270 is prevented from transferring to bypass passage 280.

In some embodiments, manifold unit 200 can include a controller 300 and one or more sensors 310, 320 to monitor operating pressure in manifold unit 200 so that vapor LP gas is selectively delivered to and isolated from outlet passage 270.

The one or more sensors can include a first pressure switch 310 coupled to outlet passage 270. In some embodiments, first pressure switch 310 is configured to monitor the pressure of vapor LP gas flowing in outlet passage 270, which corresponds to the pressure of vapor LP gas at outlet 230. In some embodiments, first pressure switch 310 is configured to signal controller 300 to deactivate compressor 110 and/or close first outlet valve 272 when pressure of vapor LP gas at outlet 230 of manifold unit 200 reaches a first pressure threshold. In the context of the present disclosure, activating the compressor 110 is energizing the motor of the compressor to drive vapor flow, and deactivating the compressor is de-energizing the motor of the compressor to cease movement of vapor flow. For example, first pressure switch 310 can be biased to an open position and configured to switch to a closed position (e.g., energizing contacts of the switch) with an electrical contact to generate an output signal when pressure in outlet passage 270 reaches the first pressure threshold. In some embodiments, the first pressure threshold ranges from 280 psi to 310 psi, such as, for example, from 290 psi to 300 psi. The first pressure threshold can correspond to a pressure rise caused by the actuation of an overfill protection device in fuel tank 30 of vehicle 20 such that first pressure switch 310 closes in response to the activation of the overfill protection device in fuel tank 30, and thereby activate controller 300 to stop refueling of fuel tank 30 in vehicle 20. For example, when the overfill protection device of fuel tank 30 closes and stops the flow of fuel into fuel tank 30, compressor 110 continues elevate pressure in outlet passage 270 until first pressure switch 310 is actuated to the closed position.

The one or more sensors can include a second pressure switch 320 coupled to discharge passage 260. In some embodiments, second pressure switch 320 is configured to monitor pressure of vapor LP gas in discharge passage 260 of manifold unit 200, which corresponds to the pressure of vapor LP gas at outlet 114 of compressor 110. In some embodiments, second pressure switch 320 is configured to signal controller 300 to deactivate compressor 110 and/or open bypass valve 262 when pressure of vapor LP gas in discharge passage 260 of manifold unit 200 reaches a second pressure threshold. For example, second pressure switch 320 can be biased to an open position and configured to switch to a closed position with an electrical contact to generate an output signal when pressure in discharge passage 260 reaches the second pressure threshold. In some embodiments, the second pressure threshold ranges from 295 psi to 315 psi, such as, for example, from 300 psi to 305 psi. The second pressure threshold can be greater than the first pressure threshold such that second pressure switch 320 when pressure of vapor LP gas in manifold unit 200 rises above an unsafe operating pressure. For example, second pressure switch 320 may be actuated if first outlet valve 272 failed to open or if first pressure switch 310 failed to be actuated.

Figure 3:
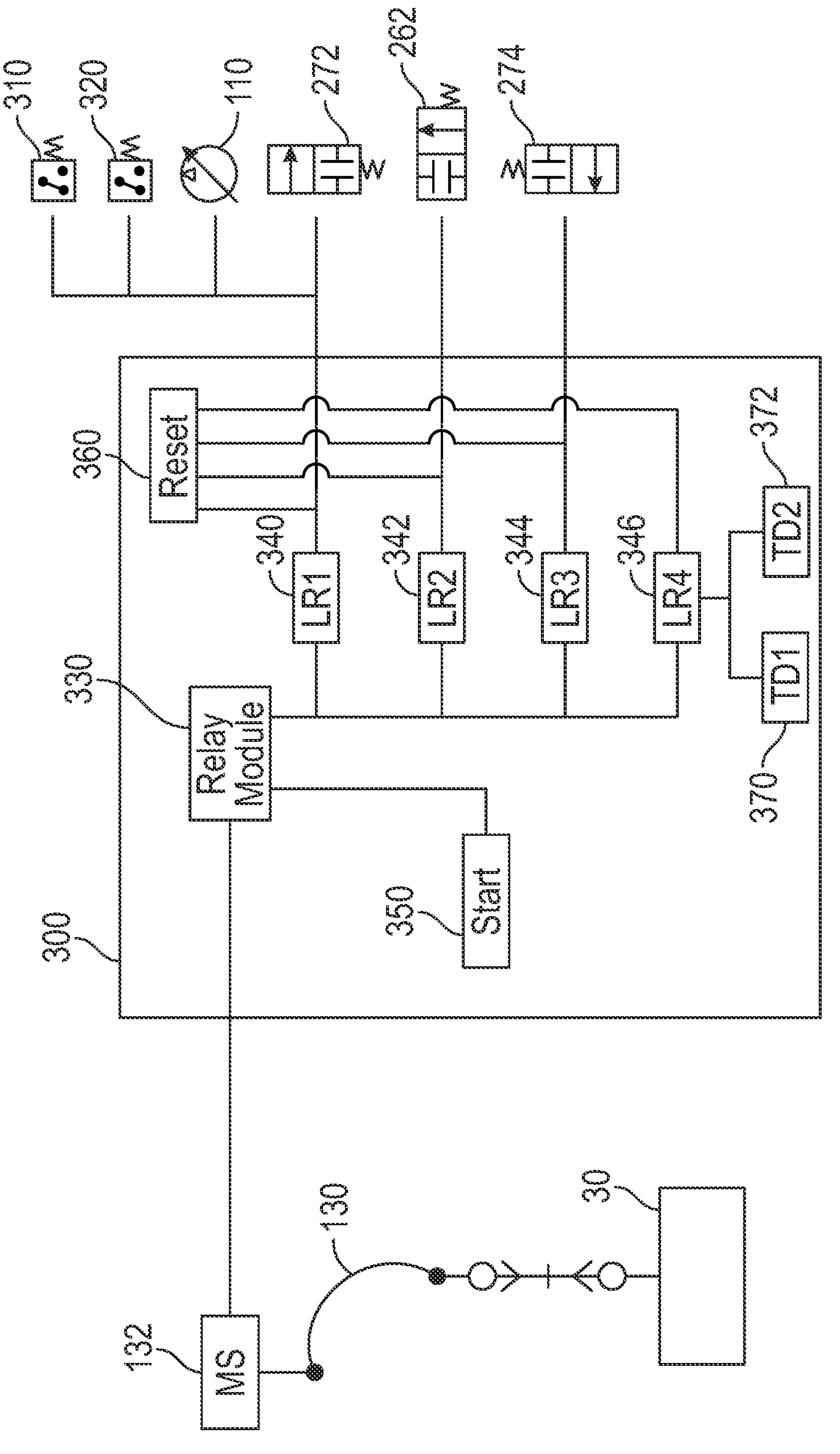
FIG. 3 illustrates a circuit diagram of a controller for a refueling system according to an embodiment of the present disclosure.

FIG. 3 illustrates a schematic circuit diagram of controller 300, according to an embodiment. Controller 300 can be operatively coupled (e.g., wired or wireless) to compressor 110 and valves 262, 272, 274, and pressure switches 310, 320 of manifold unit 200. In some embodiments, controller 300 can include a relay module 330; a plurality of latch relays 340, 342, 344, 346; a start switch 350; a reset switch 360; and a plurality of time delay modules 370, 372. In some embodiments, the plurality of latch relays 340, 342, 344, 346 can be wired to valves 262, 272, 274, pressure switches 310, 320, and compressor 110 to establish electrical communication with controller 300. Relay module 330 can be configured to selectively activate each of latch relays 340, 342, 344, 346 to trigger activation or deactivation of valves 262, 272, 274, pressure switches 310, 320, and compressor 110 according to a predetermined protocol. Start switch 350 can be configured to activate relay module 330 to initiate a fuel flow process. Reset switch 360 can be configured to trigger relay module 330 to shut off all latch relays 340, 342, 344, 346, thereby stopping the fuel transfer process. The plurality of time delay modules 370, 372 can be configured to delay relay module 330 from actuating one or more of latch relays 340, 342, 344, 346 according to a predetermined protocol. In some embodiments, controller 300 can include an emergency stop switch to shut off power to all circuitry of controller 300, thereby terminating operation of refueling system 100.

In some embodiments, the plurality of latch relays 340, 342, 344, 346 each include an electromechanical latch that can be actuated between: (i) an "on" position to distribute power to (i.e., energize) one or more of valves 262, 272, 274, first and second pressure switches 310, 320, and compressor 110; and (ii) an "off" position to cut power supplied to (i.e., de-energize) one or more of one or more of valves 262, 272, 274; first and second pressure switches 310, 320; and compressor 110. Each of the plurality latch relays 340, 342, 344, 346 can be configured to remain in the "on" or "off" position until receiving an impulse power signal from relay module 330. Each of the plurality of latch relays will default to the "off" position if their power supply is interrupted.

The plurality of latch relays can include a first latch relay 340 wired to first pressure switch 310, second pressure switch 320, compressor 110, first outlet valve 272, and reset switch 360. When first latch relay 340 is set to the "on" position, power is supplied to first pressure switch 310, second pressure switch 320, compressor 110, first outlet valve 272, and reset switch 360. In response, compressor 110 is activated to discharge vapor LP gas, and first outlet valve 272 switches from the closed position to the open position to allow discharged vapor LP gas to enter outlet 230 of manifold unit 200, ultimately allowing compressor 110 to discharge vapor LP gas to fuel tank 30 of vehicle 20. At the same time, first pressure switch 310 is energized to monitor pressure of vapor LP gas at outlet 230 of manifold unit 200, and second pressure switch 320 is energized to monitor pressure of vapor LP gas in discharge passage 260. When first latch relay 340 is set to the "off" position, power supply to first pressure switch 310, compressor 110, first outlet valve 272, and reset switch 360 is disrupted. In response, compressor 110 shuts down, and first outlet valve 272 returns to the closed position, isolating discharge passage 260 from outlet passage 270. At the same time, first and second pressure switches 310, 320 are de-energized.

The plurality of latch relays can include a second latch relay 342 wired to bypass valve 262 and reset switch 360. When second latch relay 342 is set to the "on" position, power is supplied to bypass valve 262 and reset switch 360. In response, bypass valve 262 moves from its biased open position to the closed position, thereby allowing compressor 110 to discharge vapor LP gas at a high pressure. When second latch relay 342 is set to the "off" position, power to bypass valve 262 is disrupted. In response, bypass valve 262 returns to the open position, permitting vapor LP gas to flow to bypass passage 280, thereby depressurizing discharge passage 260.

The plurality of latch relays can include a third latch relay 344 wired to second outlet valve 274 and reset switch 360. When third latch relay 344 is set to the "on" position, power is supplied to second outlet valve 274 and reset switch 360. In response, second outlet valve 274 moves from its biased closed position to the open position, permitting discharged vapor LP gas to flow from outlet passage 270 to bypass passage 280, thereby depressurizing outlet passage 270. When third latch relay 344 is set to the "off" position, power to second outlet valve 274 is disrupted. In response, second outlet valve 274 returns to the closed position, thereby isolating the depressurized outlet passage 270 from bypass passage 280.

The plurality of latch relays can include a fourth latch relay 346 wired to the plurality of time delay modules 370, 372. When fourth latch relay 346 is set to the "on" position, power is supplied simultaneously to the plurality of time delay modules 370, 372. In response, the plurality of time delay modules 370, 372 generate output signals to relay module 330 after predetermined periods of time, to trigger relay module 330 to turn off the remaining latch relays 340, 342, 344 according to a predetermined protocol. When fourth latch relay 346 is set to the "off" position, power supply to the plurality of time delay modules 370, 372 is disrupted. In response, the plurality of time delay modules 370, 372 become de-energized after generating delayed output signals to relay module 330.

In some embodiments, relay module 330 can include a plurality of switches (e.g., single-pole, single-throw relays and/or double pole, double throw relays) to selectively actuate the plurality of latch relays 340, 342, 344, 346. The switches of relay module 330 can be configured to generate power impulse signals to activate one or more of latch relays 340, 342, 344, 346. Relay module 330 can include a master switch wired to start switch 350 and a plurality of secondary switches each wired to the master switch and to one of latch relays 340, 342, 344, 346, reset switch 360, and time delay modules 370, 372.

In some embodiments, the plurality of time delay modules 370, 372 can each include an electromechanical timer relay triggered by an impulse signal generated by fourth latch relay 346 and configured to generate an output signal to relay module 330 after a set period of time from being triggered. The plurality of time delay modules can include a first time delay module 370 configured to generate a first output signal following a first period of time from being triggered by fourth latch relay 346. The first period of time can range from 0.5 to 10 seconds. The first output signal generated by first time delay module 370 can actuate relay module 330 to turn off third latch relay 344 so that power is removed from second outlet valve 274, thereby switching second outlet valve 274 from the open position to a closed position. The plurality of time delay modules can include a second time delay module 372 configured to generate a second output signal following a second period of time from being triggered by fourth latch relay 346. The second period of time can range from 0.5 to 10 seconds. In some embodiments, the second period of time is longer than the first period of time.

In some embodiments, relay module 330 may be operatively coupled to a magnetic reed switch 132 associated with delivery line 130 such that removal of delivery line 130 from a stowed position to an operating position activates relay module 330.

In some embodiments, controller 300 can include a processor (e.g., a microprocessor, a multi-core processor, a central processing unit) configured to receive input signals from first and second pressure switches 310 and 320 and generate actuation signals transmitted to compressor 110, bypass valves 262, and first and second outlet valves 272, 274 to control the flow vapor LP gas through refueling system 100. Controller 300 can include memory comprising computer storage media in the form of volatile memory, such as RAM, and/or nonvolatile memory, such as ROM. In some embodiments, the memory of controller 300 can be configured to store computer readable instructions, data structures, program modules, and other data, which are inputted to the processor for the execution of operations, as described herein. In some embodiments, controller 300 can include any type of circuitry components, such as a bus, for transmitting instructions stored in the memory to the processor.

In operation, controller 300 is configured to selectively activate and deactivate compressor 110; valves 262, 272, 274; and first and second pressure switches 310, 320 according to a predetermined protocol that includes a plurality of operation modes. The plurality of operation modes can include, for example, a standby mode, a neutral (zero) mode, a first mode, a second mode, and a third mode.

In some embodiments, during the standby mode, delivery line 130 is isolated from discharge passage 260 of manifold unit 200 via closed first and second outlet valves 272 and 274, and all circuits of controller 300 are shut down such that start and reset switches 350 and 360 are not configured to actuate relay module 330. Bypass valve 262 is set in the open position such that discharge passage 260 of manifold unit 200 is depressurized. Refueling system 100 can transition from standby mode to neutral mode when delivery line 130 is removed from the stowed position to the operating position, which causes magnetic reed switch 132 to activate relay module 330.

In some embodiments, during the neutral mode, delivery line 130 remains isolated from discharge passage 260 of manifold unit 200 via closed first and second outlet valves 272 and 274, but relay module 330 is activated, thereby energizing start switch 350. Bypass valve 262 remains set in the open position, keeping discharge passage 260 depressurized. Reset switch 360 remains de-energized during the neutral mode. When refueling system 100 is set in the neutral mode, a user may begin a LP gas refueling process by selecting start switch 350, which transitions refueling system 100 to the first mode of operation.

In some embodiments, when transitioning to the first mode, relay module 330 is configured to actuate first latch relay 340 and second latch relay 342 to the "on" position, thereby: (i) activating compressor 110 to discharge vapor LP gas, (ii) closing bypass valve 262 to raise pressure of the discharged vapor LP gas, (iii) opening first outlet valve 272 to allow the high pressure vapor LP gas to enter delivery line 130, (iv) energizing first pressure switch 310 to monitor pressure of vapor LP gas at outlet 230 of manifold unit 200, and (v) energizing second pressure switch 320 to monitor pressure of vapor LP gas in discharge passage 260 of manifold unit 200. During the first mode, vapor LP gas is drawn from storage tank 10 to compressor 110 via supply line 120 and then discharged from outlet 114 of compressor 110 through delivery line 130 to fuel tank 30 of vehicle 20. In some embodiments, refueling system 100 can transition from the first mode to the second mode when pressure of vapor LP gas at outlet 230 of manifold unit reaches a predetermined pressure (e.g., 290 psig to 300 psig), thereby closing first pressure switch 310. Closure of first pressure switch 310 generates an output signal to relay module 330 to initiate the second mode of operation. Because the first latch relay 340 is wired to reset switch 360, a user can actuate reset switch 360 to transition refueling system 100 from first mode to neutral mode.

In some embodiments, when transitioning to the second mode, relay module 330 is configured to actuate first latch relay 340 to the "off" position, thereby: (i) deactivating compressor 110 to stop discharge of vapor LP gas, (ii) closing first outlet valve 272 to isolate discharge passage 260 from outlet passage 270 and delivery line 130, and (iii) de-energizing first pressure switch 310. Second latch relay 342 remains set in the "on" position during the second mode so that discharge passage 260 remains isolated from bypass passage 280. Relay module 330 is further configured to actuate third latch relay 344 during the second mode to the "on" position, thereby opening second outlet valve 274 to direct vapor LP gas from outlet passage 270 to bypass passage 280, ultimately depressurizing outlet passage 270 and delivery line 130. Relay module 330 is further configured to actuate fourth latch relay 346 during the second mode to the "on" position, thereby activating first and second time delay modules 370 and 372. In some embodiments, refueling system 100 can transition from the second mode to the third mode when first time delay module 370 generates an output signal to relay module 330 after the first period of time. That is, the duration of the second mode for refueling system 100 corresponds to the first period of time set by first time delay module 370. Because second and third latch relay 342, 344 are wired to reset switch 360, a user can actuate reset switch 360 to transition refueling system 100 from second mode to neutral mode.

In some embodiments, when transitioning to third mode, relay module 330 is configured to actuate third latch relay 344 to the "off" position, thereby closing the second outlet valve 274 to isolate outlet passage 270 from bypass passage 280. Consequently, outlet passage 270 of manifold unit 200 is isolated from supply line 120 and all passages (e.g., intake passage 250, discharge passage 260, and bypass passage 280) located upstream. Second latch relay 342 remains set in the "on" position during the third mode so that discharge passage 260 remains isolated from bypass passage 280. In some embodiments, refueling system 100 can transition from the third mode to the neutral mode when second time delay module 372 generates an output signal to relay module 330 after the second period of time. That is, the duration of the third mode for refueling system 100 corresponds to the difference between the first and second period of times set by first and second time delay modules 370 and 372.

In some embodiments, when transitioning from third mode back to the neutral mode, relay module 330 is configured to actuate second latch relay 342 and fourth latch relay 346 to the "off" position, thereby: (i) opening bypass valve 262 to depressurize discharge passage 260 of manifold unit 200 and (ii) de-energizing first and second time delay modules 370 and 372. Opening of bypass valve 262 relieves head pressure that was accumulated while compressor 110 was previously running, ultimately reducing amperage draw during the next compressor startup request.

Figure 4:
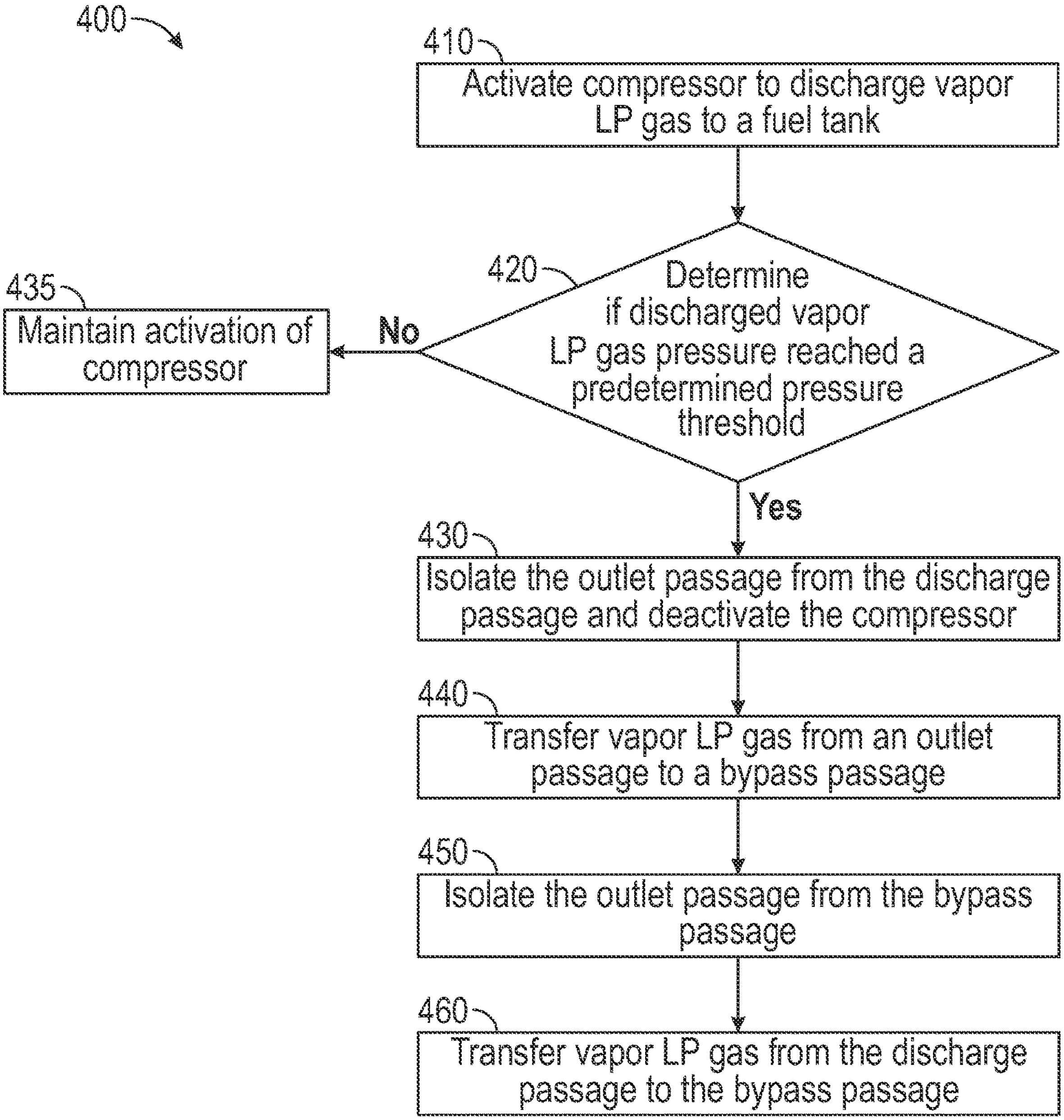
FIG. 4 illustrates a flow chart of a method of transferring fuel from a storage tank to a fuel tank of a vehicle using a refueling system according to an embodiment of the present disclosure.

FIG. 4 illustrates an example method 400 for transferring LP gas from storage tank 10 to fuel tank 30 of vehicle 20.

In some embodiments, method 400 can include a step 410 of activating compressor 110 coupled to manifold unit 200 to draw vapor LP gas from storage tank 10 and discharge the vapor LP gas through discharge passage 260 and outlet passage 270 of manifold unit 200 to fuel tank 30 of vehicle 10. Step 410 can include closing bypass valve 262 to raise pressure of the vapor LP gas discharged from compressor 110. Step 410 can include opening first outlet valve 272 to transfer vapor LP gas discharged from compressor 110 to outlet passage 270. In some embodiments, the activating of compressor 110, the closing of bypass valve 262, and the opening of first outlet valve 272 can occur simultaneously or all within a set period of time (e.g., 0.1 seconds to 2 seconds). Step 410 can include using relay module 330 of controller 300 to actuate first latch relay 340 to the "on" position to activate compressor 110 and energize first outlet valve 272 and first and second pressure switches 310 and 320. Step 410 can include using relay module 330 of controller 300 to actuate second latch relay 342 to the "on" position to close bypass valve 262.

In some embodiments, method 400 can include a step 420 of determining whether the pressure of vapor LP gas detected in outlet passage 270 (or at outlet 230) has reached a predetermined pressure threshold. Step 420 can include using first pressure switch 310 to detect the pressure of vapor LP gas in outlet passage 270 or any sensor suitable for monitoring pressure in outlet passage 270 (or outlet 230). In some embodiments, the predetermined pressure threshold corresponds to the pressure rating (the first pressure threshold) of first pressure switch 310, which is in a range from 285 psi to 305 psi, such as, for example, from 290 psi to 300 psi.

In some embodiments, method 400 can include a step 430 of isolating outlet passage 270 from discharge passage 260 and deactivating compressor 110 in response to detecting the pressure in outlet passage 270 (or outlet 230) reached the predetermined pressure threshold. Step 430 can include closing the first outlet valve 272 to isolate outlet passage 270 from discharge passage 260. Step 430 can include using relay module 330 of controller 300 to actuate the first latch relay 340 to the "off" position to deactivate compressor 110 and de-energize first outlet valve 272 and first and second pressure switches 310 and 320.

In some embodiments, method 400 can include a step 435 of maintaining the activation of compressor 110 to discharge vapor LP gas from storage tank 10 to fuel tank 30 of vehicle 20 in response to determining that the detected pressure of vapor LP gas in the outlet passage 270 (or at the outlet 230) is below the predetermined pressure threshold. Step 435 can include keeping first outlet valve 272 in the open position.

In some embodiments, method 400 can include a step 440 of transferring vapor LP gas from outlet passage 270 to bypass passage 280 of manifold unit 200 to depressurize outlet passage 270. Step 440 can include opening second outlet valve 272. Step 440 can include using relay module 330 of controller 300 to actuate third latch relay 344 to the "on" position to energize second outlet valve 272. Step 440 can include using relay module 330 of controller 300 to actuate fourth latch relay 346 to the "on" position to energize first time delay module 370 and second time delay module 372. In some embodiments, steps 430 and 440 can occur simultaneously or within set period of time (e.g., 0.1 seconds to 2 seconds).

In some embodiments, method 400 can include a step 450 of isolating outlet passage 270 from bypass passage 280 after a first period of time from the initiation of step 440. Step 450 can include closing second outlet valve 272. Step 450 can include using relay module 330 of controller 300 to actuate third latch relay 344 to the "off" position to de-energize second outlet valve 272. Step 450 can include being initiated by first time delay module 370 outputting a signal to relay module 330 after the first period of time. In some embodiments, the first period of time ranges from 0.5 seconds to 10 seconds.

In some embodiments, method 400 can include a step 460 of transferring vapor LP gas from discharge passage 260 to bypass passage 280 after a second period of time from initiating step 440. The second period of time is greater than the first period of time. In some embodiments, the second period of time ranges from 0.5 seconds to 10 seconds. Step 460 can include being initiated by second time delay module 372 outputting a signal to relay module 330 after the second period of time. Step 460 can include opening bypass valve 262. Step 460 can include using relay module 330 of controller to actuate second latch relay 342 and fourth latch relay 346 to the "off" position to de-energize bypass valve 262 and first and second time delay modules 370 and 372.

It is to be appreciated that the Detailed Description section, and not the Brief Summary and Abstract sections, is intended to be used to interpret the claims. The Brief Summary and Abstract sections may set forth one or more, but not all embodiments, and thus, is not intended to limit the disclosure and the appended claims in any way.

It will be apparent to those skilled in the relevant art(s) that various changes in form and detail can be made therein without departing from the spirit and scope of the disclosure. Thus, the disclosure should not be limited by any of the above-described embodiments, but should be defined only in accordance with the following claims and their equivalents.

What is claimed is:

1. A liquefied petroleum (LP) gas refueling system, comprising:
- a supply line connected to a storage tank storing LP gas;
- a delivery line connected to a fuel tank of a vehicle;
- a compressor connected to the supply line and the delivery line, the compressor configured to draw vapor LP gas from the storage tank through the supply line and discharge vapor LP gas through the delivery line to the fuel tank of the vehicle;
- a first outlet valve biased to a closed position to stop the discharge of vapor LP gas to the delivery line, wherein the first outlet valve is configured to be actuated to an open position to transfer vapor LP gas discharged from the compressor to the delivery line;
- a first pressure switch biased to an open position and configured to be actuated to a closed position when a pressure of vapor LP gas in the delivery line reaches a first pressure threshold; and
- a controller operatively coupled to the compressor, the first outlet valve, and the first pressure switch, wherein the controller is configured to activate and deactivate the compressor,
- wherein the controller is configured to actuate the first outlet valve to the open position when activating the compressor such that vapor LP gas discharged from the compressor transfers to the delivery line, and the controller is configured to actuate the first outlet valve to the closed position when the first pressure switch is actuated to the closed position.

2. The LP gas refueling system of claim 1, further comprising:
- a discharge passage coupled to an outlet of the compressor and the first outlet valve; and
- an outlet passage coupled to the first outlet valve and the delivery line, wherein the first pressure switch is coupled to the outlet passage.

3. The LP gas refueling system of claim 2, further comprising:
- a bypass passage coupled to the discharge passage and the outlet passage; and
- a second outlet valve coupled to the bypass passage and the outlet passage, the second outlet valve biased to a closed position to isolate the outlet passage from the bypass passage and configured to be actuated to an open position to transfer discharged vapor LP gas from the outlet passage to the bypass passage.

4. The LP gas refueling system of claim 3, wherein the controller is operatively coupled to the second outlet valve, and the controller is configured to actuate the second outlet valve to the open position when the first pressure switch is actuated to the closed position.

5. The LP gas refueling system of claim 2, further comprising:
- a second pressure switch biased to an open position; the second pressure switch configured to be actuated to a closed position when the pressure of vapor LP gas in the discharge passage reaches a second pressure threshold that is greater than the first pressure threshold.

6. The LP gas refueling system of claim 5, wherein the controller is configured to deactivate the compressor when the second pressure switch is actuated to the closed position.

7. The LP gas refueling system of claim 2, further comprising:
- a bypass valve coupled to the discharge passage and the bypass passage, the bypass valve biased to an open position to transfer vapor LP gas in the discharge passage to the bypass passage, wherein the bypass valve is configured to be actuated to a closed position to isolate the discharge passage from the bypass passage.

8. The LP gas refueling system of claim 7, wherein the controller is configured to actuate the bypass valve to the closed position when activating the compressor to discharge vapor LP gas to the delivery line.

9. The LP gas refueling system of claim 8, wherein the controller is configured to actuate the bypass valve to the open position after a predetermined period of time following deactivation of the compressor.

10. The LP gas refueling system of claim 9, wherein the predetermined period of time ranges from 0.5 seconds to 10 seconds.

11. The LP gas refueling system of claim 1, wherein the controller is configured to deactivate the compressor when the first pressure switch is actuated to the closed position.

12. A liquefied petroleum (LP) gas refueling system for a vehicle, comprising:

a compressor configured to draw vapor LP gas through a supply line from a storage tank and discharge vapor LP gas through a delivery line to a fuel tank of the vehicle;

a manifold unit comprising:

an inlet manifold coupled to the supply line and an intake of the compressor, a discharge passage coupled to an outlet of the compressor, an outlet passage coupled to the discharge passage and to the delivery line, a bypass passage coupled to the inlet manifold and the outlet passage, and a bypass valve coupled to the discharge passage and the bypass passage, wherein the bypass valve is biased to an open position to transmit vapor LP gas in the discharge passage to the bypass passage, wherein the bypass valve is configured to be actuated to a closed position to isolate the discharge passage from the bypass passage; and a controller operatively coupled to the compressor and the bypass valve, the controller configured to activate and deactivate the compressor, wherein the controller is configured to actuate the bypass valve to the closed position when activating the compressor to discharge vapor LP gas to the delivery line, and the controller is configured to actuate the bypass valve to the open position after a predetermined period of time following deactivation of the compressor.

13. The LP gas refueling system of claim 12, wherein the manifold unit further comprises:

a first outlet valve coupled to the discharge passage and the outlet passage, and a second outlet valve coupled to the outlet passage and the bypass passage, wherein the first and second outlet valves are each biased to a closed position to isolate the outlet passage from the discharge passage and the bypass passage, the first outlet valve is configured to be actuated to an open position to transfer vapor LP gas discharged from the compressor to the outlet passage, and the second outlet valve is configured to be actuated to an open position to transfer discharged vapor LP gas from the outlet passage to the bypass passage.

14. The LP gas refueling system of claim 13, wherein the controller is operatively coupled to the first and second outlet valves, and the controller is configured to actuate the first outlet valve to the open position when activating the compressor to discharge vapor LP gas to the delivery line, while setting the second outlet valve in the closed position.

15. The LP gas refueling system of claim 14, wherein in response to a pressure of vapor LP gas in the outlet passage reaching a predetermined pressure threshold, the controller is configured to: actuate the first outlet valve to the closed position, actuate the second outlet valve to the open position, and deactivate the compressor.

16. The LP gas refueling system of claim 15, wherein the controller is configured to actuate the second outlet valve to the closed position during the predetermined period of time after deactivation of the compressor and before actuating the bypass valve to the open position.

17. The LP gas refueling system of claim 15, further comprising:

a first pressure switch coupled to the outlet passage and operatively coupled to the controller, the first pressure switch biased to an open position, wherein the first pressure switch is configured to be actuated to a closed position to output a signal to the controller when pressure of vapor LP gas in the outlet passage reaches the predetermined pressure threshold.

18. The LP gas refueling system of claim 15, wherein the controller comprises a first latch relay operatively coupled to the first outlet valve, a second latch relay operatively coupled to the bypass valve, and a third latch relay operatively coupled to the second outlet valve.

19. The LP gas refueling system of claim 18, wherein the controller comprises a relay module configured to selectively actuate the first, second, and third relays according to a predetermined protocol.

20. A method for transferring vapor liquefied petroleum (LP) gas from a storage tank to a fuel tank of a vehicle, the method comprising:

activating a compressor coupled to a manifold unit to draw vapor LP gas from the storage tank and discharge the vapor LP gas through a discharge passage and an outlet passage of the manifold unit to the fuel tank of the vehicle;

isolating the outlet passage from the discharge passage and deactivating the compressor in response to detecting a pressure in the outlet passage reaching a predetermined pressure threshold;

transferring vapor LP gas from the outlet passage to a bypass passage of the manifold unit to depressurize the outlet passage;

isolating the outlet passage from the bypass passage after a first period of time from initiating the transferring of vapor LP pas from the outlet passage to the bypass passage;

transferring vapor LP gas from the discharge passage to the bypass passage after a second period of time from initiating the transferring of vapor LP pas from the outlet passage to the bypass passage, wherein the second period of time is greater than the first period of time.

21. The method of claim 20, wherein the activating of the compressor comprises closing a bypass valve coupled to the discharge passage and the bypass passage to raise pressure of the vapor LP gas discharged from the compressor, and wherein the transferring of vapor LP gas from the discharge passage to the bypass passage comprises opening the bypass valve.

22. The method of claim 20, wherein the activating of the compressor comprises opening a first outlet valve coupled to the discharge passage and the outlet passage to transfer vapor LP gas discharged from the compressor to the outlet passage, and wherein the isolating of the outlet passage from the discharge passage comprises closing the first outlet valve.

23. The method of claim 22, wherein the transferring of vapor LP gas from the outlet passage to the bypass passage comprises opening a second outlet valve coupled to the outlet passage and the bypass passage, and wherein the isolating the outlet passage from the bypass passage comprises closing the second outlet valve.

* * * * *